Aug. 20, 1929.  F. GRIEB  1,725,633
INTERCONNECTION OF ELECTRICAL SYSTEMS
Filed Jan. 9, 1928
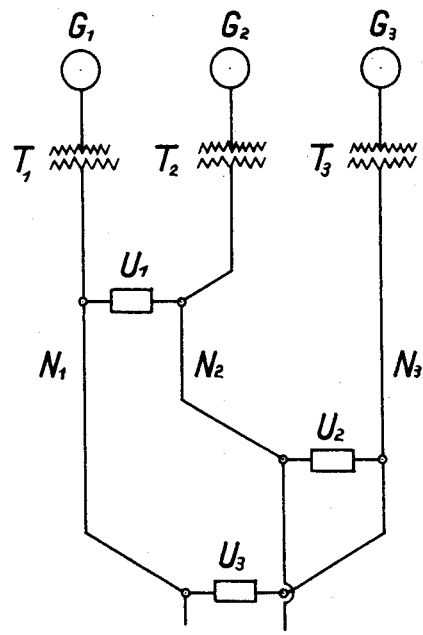
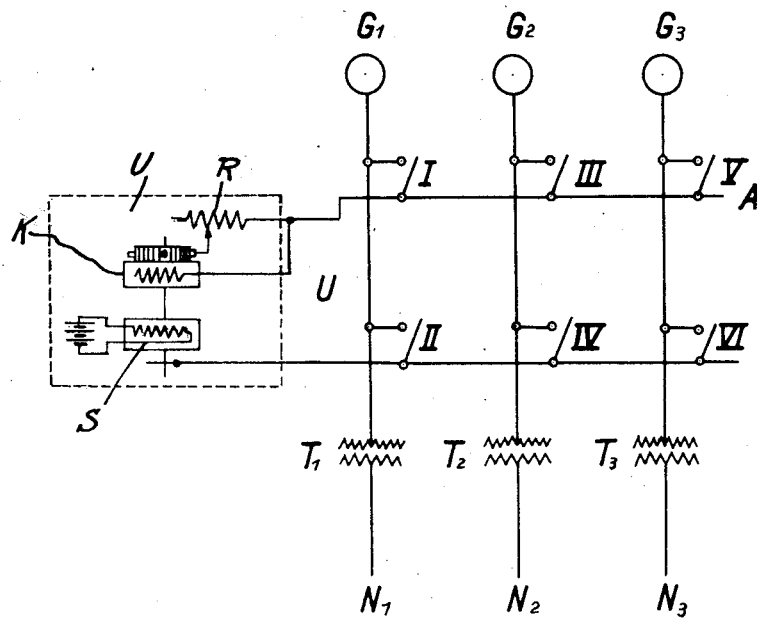

Patented Aug. 20, 1929.

1,725,633

UNITED STATES PATENT OFFICE.

FRITZ GRIEB, OF BADEN, SWITZERLAND, ASSIGNOR TO AKTIENGESELLSCHAFT BROWN, BOVERI AND CIE., OF BADEN, SWITZERLAND.

INTERCONNECTION OF ELECTRICAL SYSTEMS.

Application filed January 9, 1928, Serial No. 245,538, and in Germany December 22, 1926.

This invention relates to electrical systems comprising more than two distinct alternating current networks between which interconnection is desired for purposes of load equalization and is particularly concerned with a method of interconnection using motor-generator sets.

The object of the invention is to provide a scheme for the interconnection of such electrical networks for the purpose of load equalization whereby full control of the transfer of energy is obtained with the minimum expenditure on extra plant and machinery.

A further object is the provision of an interconnection scheme as above in which a single motor-generator set in conjunction with suitable switching equipment may be used to effect the interconnection of the systems and control the transfer of energy as required.

Other and further objects of the invention will be pointed out hereafter, indicated in the appended claims, or will be obvious to one skilled in the art upon an understanding of the invention or its employment in practice.

In the accompanying drawing forming part of this specification I show one specific example embodying the invention, but it must be understood that this is presented for purpose of illustration only and is not to be accorded any interpretation having the effect of limiting the claims short of the true and most comprehensive scope of the invention in the art.

In the drawing:—

Figure 1 is a diagrammatic representation of three interconnected electrical systems in accordance with prior-art practice;

Figure 2 is a diagrammatic representation of an interconnection scheme for three systems embodying the invention.

When a number of alternating current systems are fed from independent power sources, the maximum amount of energy for each system is limited by the capacity of the power source from which it is supplied. In many cases, however, the demand is a fluctuating one and load peaks exceeding the maximum installed generator capacity occur. Such eventualities are frequently met by tying together adjacent systems by means of suitable machines which permit a transfer of energy to take place in the desired direction and thus enable an excessive load in one system to be met by the withdrawal of surplus energy from another system less heavily loaded. Load transferring sets of this description may consist of a synchronous machine coupled either to a commutator machine or to a so-called commutator cascade, the synchronous machine being connected to one system and the commutator machine or cascade set being connected to the other. By suitably adjusting the commutator machine the flow of energy through the set may be controlled and caused to take place in either the one or the other direction as desired. Such interconnecting sets are usually placed in substations and since the voltages of the systems in question are often widely different it is necessary either to design the machines for these voltages or where this cannot be done to provide transformers, which latter is a costly alternative. The difficulties of interconnection by such means become very pronounced when a number of systems are required to be interconnected in such a way that energy may be withdrawn as desired from any one system to supply a deficit in any other.

A clearer understanding of the problem under consideration will be obtained by reference to the simple example illustrated in Figure 1 of the drawing accompanying this specification. This shows three interconnected systems $N_1$, $N_2$ and $N_3$ supplied through transformers $T_1$, $T_2$, $T_3$ from three generators $G_1$, $G_2$ and $G_3$. The three systems are interconnected by the three load transferring sets $U_1$, $U_2$, $U_3$. In general the position and extent of such systems will be decided by the position of the centres of demand and there will only be a few substations in sufficiently close proximity to both systems to permit the installation of load transferring sets. The three sets $U_1$, $U_2$ and $U_3$ shown in Figure 1 are located at points a considerable distance apart. Each of the sets forms a connecting link between two systems and although only one system is likely to require additional energy at any one time it is necessary to install three sets in order that all possible contingencies may be provided for. If high tension or extra high tension systems are involved the sets $U_1$, $U_2$ and $U_3$ must be provided with suitable transformers, which although increasing the installation costs nevertheless permit sets of identical design to be employed.

A much better arrangement is obtained, however, if the three generators are directly interconnected by means of suitable load transferring equipment. This will necessitate an auxiliary main between the generators, but in the special case where all three generators are wound for the same voltage this method of interconnection requires no more than one load transferring set which may be connected to any two generators as required without the interposition of transformers. This arrangement will usually require two switches per generator to enable the terminals of the same to be connected to the appropriate component of the load transferring set. A two-way switch may be substituted for the two independent switches if desired. The auxiliary main referred to above will comprise two sets of conductors having an appropriate number of phases, one connected to the terminals of the synchronous machine and the other with the terminals of the commutator machine or cascade unit.

An understanding of the invention will be most readily obtained from a consideration of the specific example illustrated in Figure 2 of the drawing. In this figure the reference characters A and B denote the two three-phase auxiliary mains, U the load transferring set, $G_1$, $G_2$, $G_3$ the generators, $T_1$, $T_2$, $T_3$ the main transformers, and $N_1$, $N_2$, $N_3$ the three alternating current systems. The switches I, II, III, IV, V and VI, permit the load transferring set to be connected to the generators as circumstances dictate. The load transferring set U comprises a commutator machine K and a synchronous machine S, the main A comprising the appropriate number of phase conductors being connected to the commutator machine and the main B also comprising the appropriate number of conductors being connected to the direct current excited synchronous machine S. The rotor voltage of the machine K may be controlled in the usual manner by means of a regulating transformer R. In order to interconnect the generators $G_2$ and $G_3$ it is only necessary to close switches III and VI. If the generators are located in the same power station the interconnecting mains will be short. Where the number of systems and associated generators exceeds three it may be advisable to install additional load transferring sets, but whatever the circumstances the adoption of the method here set forth will result in a considerable saving of machines as well as of transformers and switch gear.

Having now described my invention, what I claim as new and desire to secure by Letters Patent is:—

1. In an interconnected electrical power network the combination with more than two distinct systems each fed by a separate generator or group of generators, of an auxiliary load transferring set consisting of a synchonous machine coupled to a commutator machine, means for directly connecting the terminals of said synchronous machine to a selected generator or group of generators, means for directly connecting the terminals of said commutator machine to a second selected generator or group of generators and control means associated with the aforesaid load transferring set whereby said set may be made to transmit energy in the required direction.

2. In an interconnected electrical power network the combination with more than two distinct systems each fed by a separate generator or group of generators, of two mains passing in proximity to said generators, single-way switches connecting each generator or group of generators to each main, an auxiliary load transferring set connected between the two mains aforesaid, said set consisting of a synchronous machine coupled to a commutator machine, and control means associated with said set whereby energy may be sent in one or the other direction as desired.

In testimony whereof I have signed my name to this specification.

FRITZ GRIEB.